(12) United States Patent
Morrison

(10) Patent No.: US 7,088,258 B2
(45) Date of Patent: Aug. 8, 2006

(54) TILT SENSOR APPARATUS AND METHOD THEREFOR

(75) Inventor: Christopher S. Morrison, Scottsdale, AZ (US)

(73) Assignee: Nuvo Holdings, LLC, Scottsdale, AZ (US)

( * ) Notice: Subject to any disclaimer, the term of this patent is extended or adjusted under 35 U.S.C. 154(b) by 0 days.

(21) Appl. No.: 10/906,646

(22) Filed: Feb. 28, 2005

(65) Prior Publication Data

US 2005/0195091 A1 Sep. 8, 2005

Related U.S. Application Data

(63) Continuation-in-part of application No. 10/795,720, filed on Mar. 8, 2004.

(60) Provisional application No. 60/650,307, filed on Feb. 3, 2005, provisional application No. 60/551,191, filed on Mar. 8, 2004.

(51) Int. Cl.
*G08B 21/00* (2006.01)

(52) U.S. Cl. .................... 340/689; 340/545.5; 340/571

(58) Field of Classification Search ................ 340/429, 340/440, 467, 545.5, 286.13, 575, 669, 686.1, 340/689; 200/61.45 R, 61.52, 220; 73/862.61, 73/718

See application file for complete search history.

(56) References Cited

U.S. PATENT DOCUMENTS

| | | |
|---|---|---|
| 3,170,597 A | 2/1965 | Reichenberger |
| 3,733,447 A | 5/1973 | Schneider, Jr. |
| 3,742,478 A | 6/1973 | Johnson |
| 3,748,415 A | 7/1973 | Suzuki |
| 3,845,883 A | 11/1974 | Johnson et al. |
| 3,935,701 A | 2/1976 | Yamauchi et al. |
| 4,135,067 A | 1/1979 | Bitko |
| 4,168,410 A | 9/1979 | Norris |
| 4,196,429 A | 4/1980 | Davis |
| 4,278,854 A * | 7/1981 | Krause ..................... 200/52 A |
| 4,450,326 A | 5/1984 | Ledger |
| 4,497,118 A | 2/1985 | Byrum |
| 4,547,972 A | 10/1985 | Heidel et al. |
| 4,584,885 A | 4/1986 | Cadwell |
| 4,591,676 A | 5/1986 | Jackman et al. |
| 4,628,160 A | 12/1986 | Canevari |
| 4,686,335 A | 8/1987 | Grant |
| 4,751,353 A | 6/1988 | Stephens |

(Continued)

OTHER PUBLICATIONS

"Microchip: 14-Pin FLASH-based 8-Bit CMOS Microcontroller" 2003 Microchip Technology Inc. Selected pp. 1-30.

*Primary Examiner*—Van T. Trieu
(74) *Attorney, Agent, or Firm*—Meschkow & Gresham, P.L.C.

(57) ABSTRACT

A tilt sensor apparatus (36) includes one or more tilt sensors (42). Each tilt sensor (42) includes a conductive element (64) entrapped within an opening (46) formed through a middle planar substrate (38). The opening is surrounded by an opening wall (52) which is entirely covered by a conductor (54). A conductive star pattern (100') is formed on a top planar substrate (40), and a conductive star pattern (100") is formed on a bottom planar substrate (44). The star patterns (100) are positioned at opposing ends of the opening (46). The conductive element moves within the opening (46) as the apparatus (36) is tilted. An interrupt-driven control circuit (124) is configured to indicate a change in orientation only when a short is first detected across a contact pair (54/56, 54/60) that corresponds to an orientation opposite to a currently-indicated orientation.

49 Claims, 7 Drawing Sheets

U.S. PATENT DOCUMENTS

| | | |
|---|---|---|
| 4,833,281 A | 5/1989 | Maples |
| 4,866,850 A | 9/1989 | Kelly et al. |
| 4,884,067 A | 11/1989 | Nordholm et al. |
| 5,006,676 A | 4/1991 | Bogut et al. |
| 5,025,246 A | 6/1991 | Schenkel |
| 5,136,127 A | 8/1992 | Blair |
| 5,153,394 A | 10/1992 | Abendroth et al. |
| 5,252,795 A | 10/1993 | Su |
| 5,255,819 A | 10/1993 | Peckels |
| 5,285,033 A | 2/1994 | Ipcinski |
| 5,343,766 A | 9/1994 | Lee |
| 5,406,256 A | 4/1995 | Ledel et al. |
| 5,410,113 A | 4/1995 | Mielke |
| 5,430,532 A * | 7/1995 | Ueda et al. .................. 399/263 |
| 5,457,293 A | 10/1995 | Breed |
| 5,460,710 A | 10/1995 | Williams et al. |
| 5,507,182 A | 4/1996 | Yamada et al. |
| 5,507,411 A | 4/1996 | Peckels |
| 5,543,767 A | 8/1996 | Elenbaas |
| 5,597,066 A | 1/1997 | Burmester |
| 5,627,316 A | 5/1997 | De Winter et al. |
| 5,639,999 A | 6/1997 | Hsu |
| 5,669,147 A | 9/1997 | Nakajima et al. |
| 5,808,254 A | 9/1998 | Wu |
| 5,900,602 A | 5/1999 | Bitko |
| 5,923,263 A * | 7/1999 | Rodriguez ................... 340/689 |
| 5,955,713 A * | 9/1999 | Titus et al. ............... 200/61.52 |
| 5,987,988 A | 11/1999 | Kunimi et al. |
| 6,005,205 A | 12/1999 | Chou |
| 6,028,275 A | 2/2000 | Jou |
| 6,036,055 A | 3/2000 | Mogadam et al. |
| 6,172,357 B1 | 1/2001 | Sano et al. |
| 6,198,059 B1 | 3/2001 | Jou |
| 6,323,446 B1 | 11/2001 | Schnell |
| 6,339,199 B1 | 1/2002 | Chou et al. |
| 6,341,428 B1 | 1/2002 | Tanazawa et al. |
| 6,409,046 B1 | 6/2002 | Peckels |
| 6,442,855 B1 | 9/2002 | Takeuchi et al. |
| 6,504,481 B1 | 1/2003 | Teller |
| 6,518,523 B1 | 2/2003 | Chou |
| 6,559,396 B1 | 5/2003 | Chou |
| 6,630,635 B1 | 10/2003 | Doepner |
| 6,706,978 B1 | 3/2004 | Wagatsuma et al. |
| 6,800,841 B1 | 10/2004 | Chou |
| 2003/0055589 A1 | 3/2003 | Mogadam |
| 2003/0110652 A1 | 6/2003 | Greway |
| 2004/0084290 A1 | 5/2004 | Higgins et al. |

* cited by examiner

TILT SENSOR APPARATUS AND METHOD THEREFOR

RELATED INVENTION

The present invention claims benefit under 35 U.S.C. 119(e) to "Inventory Systems and Methods," U.S. Provisional Patent Application Ser. No. 60/551,191, filed 8 Mar. 2004, and to "Inventory Systems and Methods," U.S. Provisional Patent Application Ser. No. 60/650,307, filed 3 Feb. 2005, both of which are incorporated by reference herein.

The present invention is a continuation-in-part of "Asset Tag with Event Detection Capabilities," Ser. No. 10/795,720, filed 8 Mar. 2004, having at least one inventor in common herewith, which is incorporated by reference herein.

TECHNICAL FIELD OF THE INVENTION

The present invention relates generally to tilt sensors and more specifically to tilt sensors having conductive elements that move under the influence of gravity and that electrically short various contacts depending on the orientation of the sensor.

BACKGROUND OF THE INVENTION

Many applications detect an orientation of a device relative to the acceleration of gravity. One such application is an asset tag that detects the tilting of a container in which bulk product is stored to signal that the bulk product is being dispensed from the container. In this application, as in many others, the asset tag may be battery powered and is desirably as small as possible. Moreover, in this application, as in many others, for a system to be effective many asset tags may be used, and costs for a single asset tag are desirably as low as possible because those costs are multiplied by the number of asset tags that are used in an entire system.

In this asset tag application, as well as in other applications, tilt sensors are used to sense the orientation of the devices in which the tilt sensors are mounted. Traditionally, mercury switches have been adapted to serve as tilt sensors. But mercury switches are undesirable for a variety of reasons. Mercury switches pose a health hazard due to the presence of mercury. Moreover, mercury switches tend to be undesirably large and far too expensive for many applications. In applications where a need exists to sense more than one tilt angle, the large size and excessive expense problems are multiplied by the number of sensors that may be used in a single device.

An alternative to mercury switches may be found in solid sensors. Solid sensors are characterized by entrapping a solid, non-mercurous, conductive element, typically but not always spherically shaped, within a chamber. In one version of a solid sensor, the conductive element operates in conjunction with various electrical contacts that are also in the chamber. As the sensor is tilted, the acceleration of gravity causes the conductive element to move within the chamber, where it occasionally electrically shorts at least some of the contacts together. Solid sensors are highly desirably to the extent that they solve the health hazard problem posed by mercury switches. But the conventional solid sensors do not include a low power, small, inexpensive, and reliable unit.

Some solid sensors include active semiconductor components, such as optical emitters and detectors, that must remain energized in order for orientation to be monitored. Such devices consume far too much power for many low power applications. In addition, some solid sensors are configured with power-consuming circuitry, such as pull-up resistors, that in at least one orientation continuously consume a significant amount of power. These devices also consume too much power for many low power applications, and are particularly undesirable for applications where the use of more than one tilt sensor would be beneficial.

Conventional solid sensors are built using a stand-alone housing that may be mounted on a printed wiring board (PWB) but that extends above the printed wiring board more than most other components. When the sensor housing is larger than other electrical components, the sensor housing becomes a major factor in determining the size of the device, such as an asset tag, in which the sensor is used. This is an undesirable size characteristic because the sensor, more than the other components, prevents the device from being smaller. And, this size characteristic is exacerbated where the use of more than one tilt sensor would be desirable.

In addition, in battery-powered applications, tilt sensors that consume too much power cause either an undesirably large battery to be used or require the device to include special battery compartments where replaceable batteries are located. Larger batteries and special compartments for replaceable batteries lead to larger devices. And, the use of replaceable batteries, and particularly batteries that require frequent replacement, is undesirable in many applications due to the nuisance factor, the costs of replacement batteries, and the excessive unreliable operational time that must be endured when battery reserves are low.

The stability and/or reliability of conventional solid sensors has been a challenging problem. The sensor's solid conductive element should readily move under the influence of gravity so that desired tilt orientations may be detected. But this feature makes a continuous, robust electrical short between contacts difficult to make and maintain. Consequently, solid sensors tend to exhibit frequent false-open errors. False-open errors occur when the orientation of the sensor is such that a short between certain contacts should occur but does not. The false-open condition may appear only momentarily.

In fact, solid sensors can be so sensitive to movement and so unable to make and maintain a continuous robust electrical short that they are often configured as motion detectors or jitter switches rather than tilt sensors. In this configuration mere movement, even without altering tilt angle, causes the conductive element to produce a number of spurious shorts and opens between contacts. Many solid sensors are configured to heighten this effect. One way the spurious output may be heightened is to miniaturize the sensor so that the conductive element has less distance to travel within its chamber between locations where it produces contact shorts and opens. Unfortunately, while such miniaturization may be desirable for motion sensing, it tends to make solid sensors less reliable and useful when used as tilt sensors.

Some conventional solid sensors have addressed the stability and reliability problems posed for tilt sensing. But the conventional solutions have resulted in larger, more complex, more expensive components. Typically, complex structures may be included in the chamber with the conductive element to implement internal baffles, flanges, and detents with the aim of reducing spurious signals in the presence of mere movement that does not amount to tilting. In many applications where tilt sensors are needed these solutions are undesirable due to the expense and size. And, these solutions are particularly undesirable for applications where the use of more than one tilt sensor would be beneficial.

SUMMARY OF THE INVENTION

Accordingly, it is an advantage of the present invention that an improved tilt sensor apparatus and method therefor are provided.

Another advantage is that a tilt sensor apparatus having one or more sensors that consume very little power is provided.

Another advantage is that a tilt sensor apparatus having one or more sensors and occupying only a little space is provided.

Another advantage is that a tilt sensor apparatus having one or more sensors and being inexpensive to manufacture is provided.

Another advantage is that a tilt sensor apparatus having one or more sensors and providing a reliable and robust indication of tilt angle is provided.

A portion of these and/or other advantages are realized in one form by a tilt sensor apparatus which includes first, second, and third planar substrates and a conductive element. The first planar substrate has a top surface on which a first conductive layer resides. The first conductive layer is formed into a bottom pattern having alternating conductive and void regions. The conductive regions of the bottom pattern are electrically coupled together. The second planar substrate overlies the top surface of the first substrate. The second substrate has an opening overlying the pattern and surrounded by an opening wall, and the second substrate has an inter-substrate conductor on the opening wall, where the inter-substrate conductor continuously occupies first and second annular tangential-contact bands in the opening wall. The third planar substrate overlies the second substrate and has a bottom surface on which a third conductive layer resides. The conductive element is positioned within the opening and configured to move within the opening to short the first conductive layer to the inter-substrate conductor when resting on the first substrate and in contact with the annular tangential-contact band.

At least a portion of the above and/or other advantages are realized in another form by a tilt sensor apparatus which includes first, second, and third planar substrates, a conductive element, and a battery. The first planar substrate has a top surface on which a first conductor resides. The second planar substrate overlies the top surface of the first substrate. The second substrate has an opening surrounded by an opening wall, and the second substrate has a second conductor on the opening wall. The third planar substrate overlies the second substrate and has bottom surface on which a third conductor resides. The conductive element is positioned within the opening and is configured to move within the opening to short the first and second conductors together when resting on said first substrate. The battery is vertically aligned with the second substrate and in contact with one of the first and third conductors.

At least a portion of the above and/or other advantages are realized in yet another form by a method of operating a low power tilt sensor having a first pair of contacts, a second pair of contacts, and a conductive element that moves under the acceleration of gravity to short the first pair of contacts when said tilt sensor is tilted in a first orientation and to short the second pair of contacts when said tilt sensor is tilted in a second orientation. The method calls for sensing a shorted condition at the first pair of contacts. A first-orientation indicator is generated in response to the sensing activity. A power-consuming element that is coupled to the first pair of contacts is decoupled in response to the sensing activity. And, a power-consuming element is coupled to the second pair of contacts in response to the sensing activity. In response to the coupling activity, the second pair of contacts is monitored for a shorted condition.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF THE PREFERRED EMBODIMENTS

Figure 1:
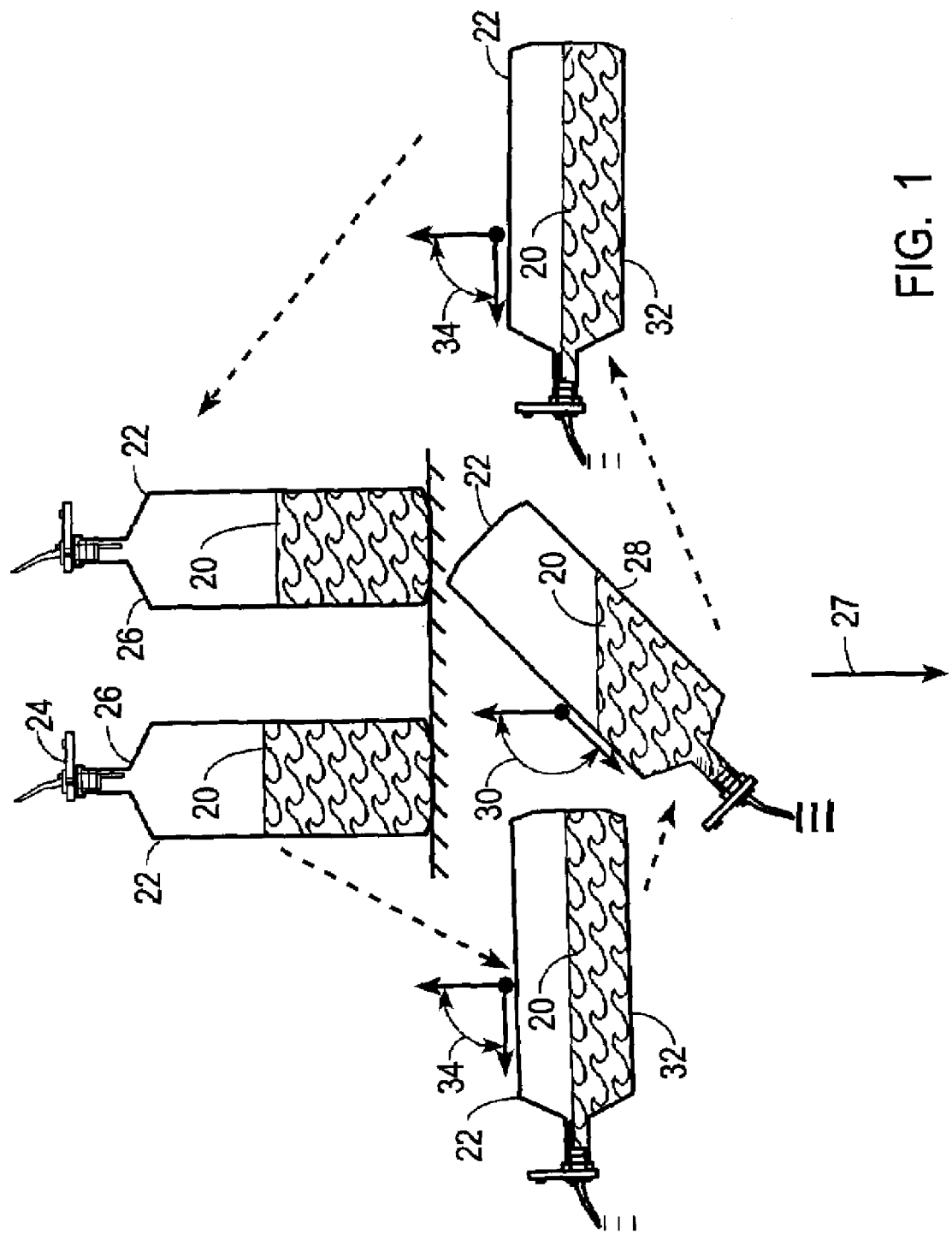
FIG. 1 shows a sequence depicting the dispensing of a bulk product from a container.

FIG. 1 shows one of many different applications where a tilt sensor apparatus configured in accordance with the teaching of the present invention may be used. In particular, FIG. 1 shows a sequence of events depicting the dispensation of a bulk product 20 in the form of a liquid from a container 22 in the form of a bottle.

In accordance with this application, product 20 is dispensed by a user, such as a bartender or other product server, when the user pours product 20 from container 22 by tilting container 22. FIG. 1 depicts three different orientations for a container 22 that is equipped with an asset tag 24. Asset tag 24 is a battery powered, electronic device that includes a tilt sensor apparatus, discussed in detail below. In an upright orientation 26, no product 20 is being dispensed from container 22. The acceleration of gravity 27 keeps product 20 in the lower portion of container 22.

When it is desired to dispense product 20 from container 22, container 22 is tilted away from its upright orientation 26. Desirably, container 22 is quickly tilted to a pour orientation 28, which is greater than an angle 30 of approximately 135° displaced from upright orientation 26. So long as the tilt angle remains greater than approximately 135°, product 20 is dispensed at a roughly consistent dispensation rate regardless of the precise tilt angle. Asset tag 24 is configured to time the duration container 22 spends at a tilt angle greater than angle 30 so that the amount of product 20 dispensed can be calculated by multiplying this duration by a dispensation rate.

But in order for pour orientation 28 to be reached from upright orientation 26, container 22 is first tilted to and through an intermediate orientation 32. In the preferred embodiment, intermediate orientation 32 begins at an angle 34 of around a 90° displacement from upright orientation 26 and extends to angle 30. Likewise, around the completion of the dispensation of product 20, container 22 is again tilted to and through intermediate orientation 32 as container 22 is repositioned back to upright orientation 26.

Some product 20 may be dispensed while container 22 is tilted in intermediate orientation 32, depending on the amount of product 20 in container 22, its viscosity, and other factors. But the dispensation rate is likely to be erratic and lower than the dispensation rate when container 22 is in pour orientation 28. Most bar-industry professionals consider a pour to be proper only if container 22 is tilted to pour orientation 28. In order to accurately describe the amount of product 20 dispensed from container 22 and to gain knowledge about the occurrences of improper pours, asset tag 24 detects the duration spent in intermediate orientation 32 and the duration spent in pour orientation 28. These two orientations are sensed by the tilt sensor apparatus mounted within asset tag 24. Desirably, the timing information describing the pour event is communicated from asset tag 24 to a central facility, where the central facility then performs various inventory, financial, and/or management functions.

While FIG. 1 depicts a dispensation from a bottle type of container, those skilled in the art will appreciate that dispensations may also occur from other types of containers to which asset tags 24 may be coupled. Moreover, a container is broadly construed to mean any device or object from which product 20 may be dispensed, and specifically includes such devices as the tap handles associated with containers from which on-tap beverages are dispensed. Asset tags 24 may come in a variety of sizes and shapes and be configured to attach to a variety of different containers 22 and to different locations on containers 22, including at the bottom of bottles. And, tilt sensor apparatuses configured in accordance with the teaching provided herein may be used in a wide variety of applications other than asset tags, whether such applications are battery-powered or not.

Figure 2:
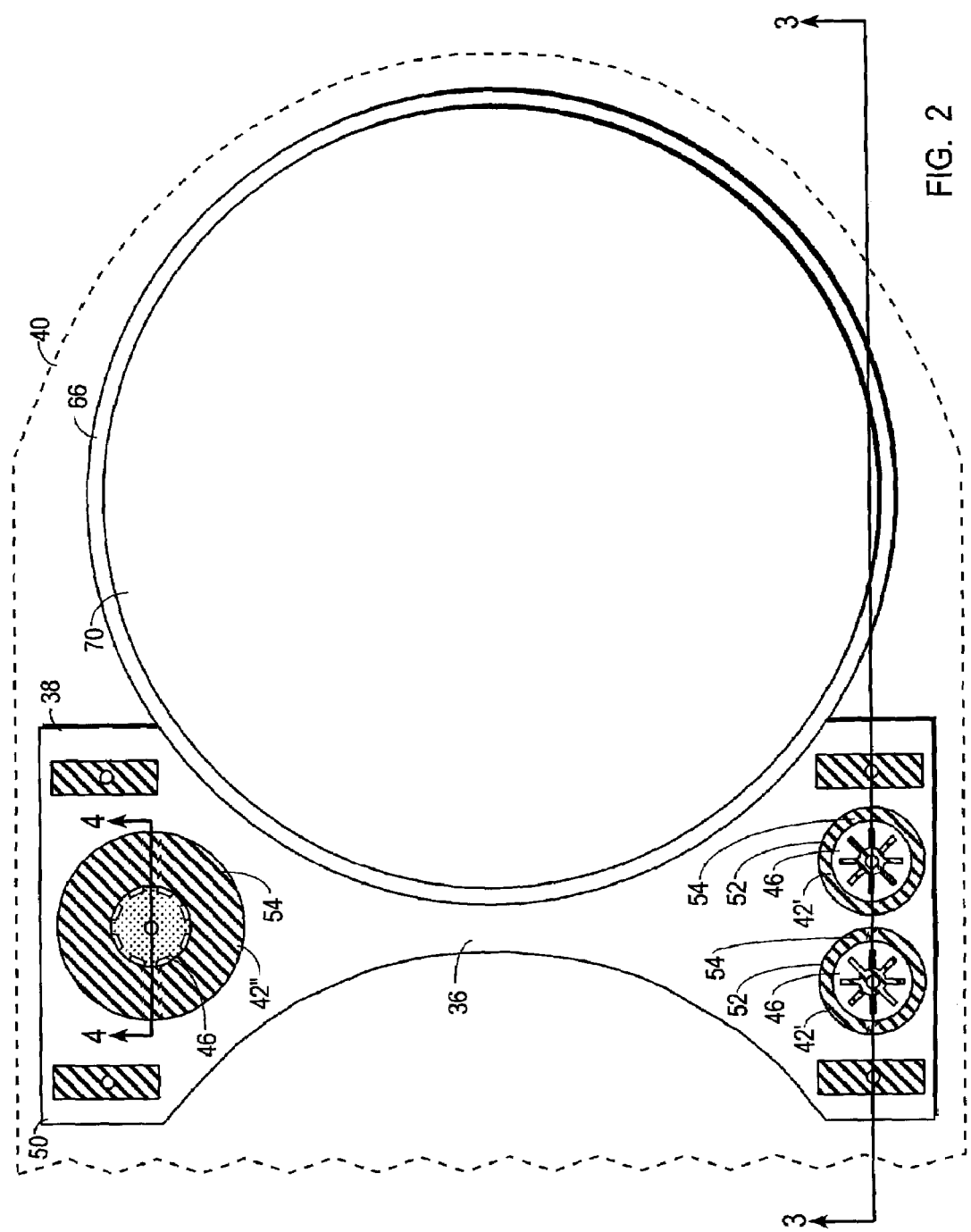
FIG. 2 shows a top view of a portion of a tilt sensor apparatus, looking at a middle substrate, with a top substrate shown in phantom.
Figure 3:
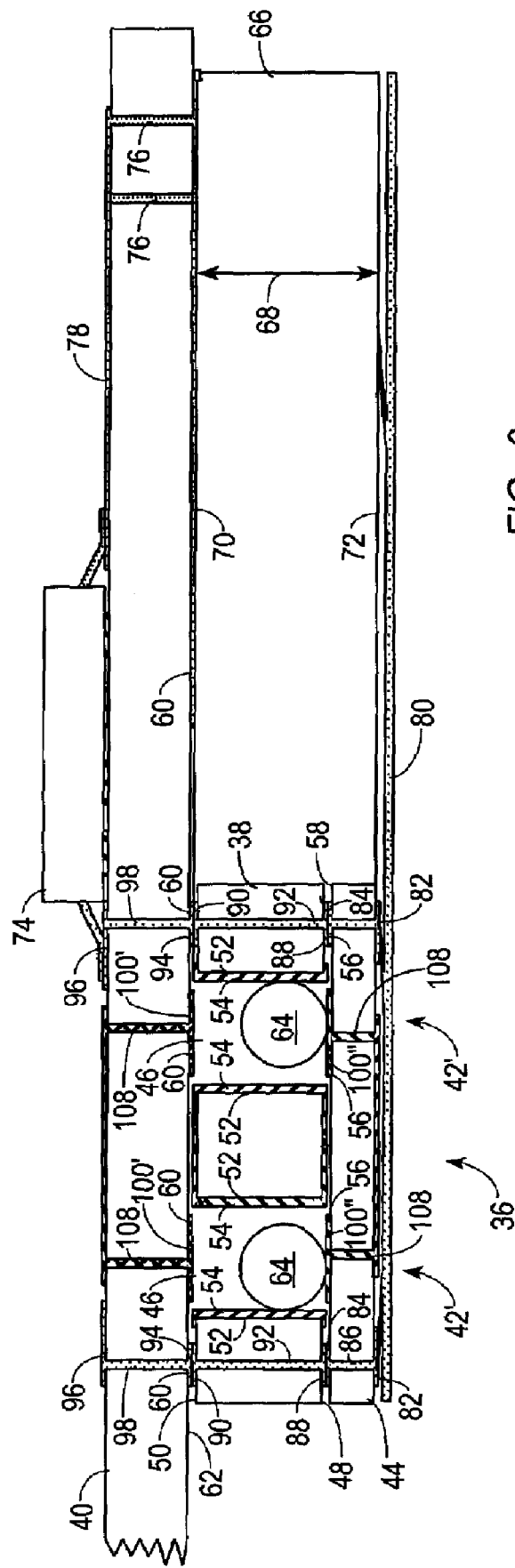
FIG. 3 shows a side view of the tilt sensor apparatus of FIG. 2, specifically depicting first and second tilt sensors.

FIG. 2 shows a top view of a portion of a tilt sensor apparatus 36, looking at a middle substrate 38, with an upper substrate 40 shown in phantom. FIG. 3 shows a side view of first and second tilt sensors from tilt sensor apparatus 36, and FIG. 4 shows a side view of a third tilt sensor.

Figure 4:
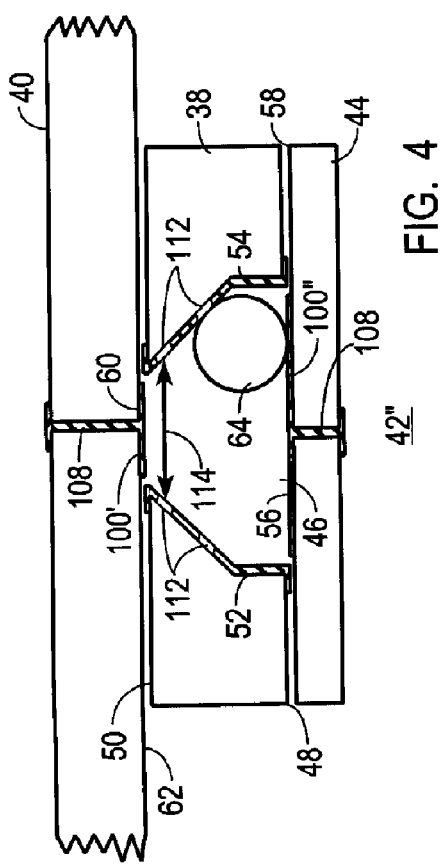
FIG. 4 shows a side view of a third tilt sensor from the tilt sensor apparatus of FIG. 2.

Referring to FIGS. 2–4, the specific embodiment of tilt sensor apparatus 36 depicted in these figures includes three individual tilt sensors 42, but that number is not a requirement of the present invention. Tilt sensor apparatus 36 may include one or more tilt sensors 42. For the asset tag 24 application (FIG. 1), two individual tilt sensors 42' are coupled in parallel and both detect an approximately 90° or greater tilt angle, and one individual tilt sensor 42" detects an approximately 135° or greater tilt angle. Two tilt sensors 42' are coupled in parallel to improve reliability and accuracy. Tilt sensors 42' are depicted in the side view of FIG. 3, and tilt sensor 42" is depicted in the side view of FIG. 4. Due to the small size and inexpensive nature of tilt sensor apparatus 36, no significant disadvantage results from including as few or as many individual tilt sensors 42 as may be beneficial for the application in which tilt sensor apparatus 36 is being applied.

Tilt sensor apparatus 36 includes mechanical features and/or electrical features. The mechanical features are based around a stack of three substrates, namely a lower insulating, planar substrate 44, middle insulating, planar substrate 38, and upper insulating, planar substrate 40.

Those skilled in the art will appreciate that while tilt sensor apparatus 36 is configured to be influenced by the acceleration of gravity 27, directional terms used herein, such as top, upper, middle, bottom, lower, upright, overlie, underlie, over, under, vertical, horizontal, and the like, are used in a relative sense only and that the meaning of these terms is consistent with the views illustrated in the figures. This relative use of directional terms is being adopted so that the reader may readily understand the invention taught herein. Nothing requires tilt sensor apparatus 36 to be manufactured, used, or sold in only one orientation where these directional terms are consistent with the direction of gravity 27, and nothing requires tilt sensor apparatus 36 to be manufactured, used, or sold only in an orientation consistent with the views illustrated in the figures.

Substrates 44, 38, and 40 are all formed from conventional printed wiring board (PWB) materials in the preferred embodiment, and are all manufactured using conventional printed wiring board materials and techniques. The use of such materials and techniques promotes the inexpensive manufacturing nature of tilt sensor apparatus 36.

For each tilt sensor 42, a through opening 46, also called a chamber or cavity, is formed from a bottom surface 48 of middle substrate 38 through middle substrate 38 to a top surface 50 of middle substrate 38. An opening wall 52 surrounds opening 46 and extends between bottom and top surfaces 48 and 50. An intra-substrate conductor 54 resides on opening wall 52. Opening 46 overlies a conductor 56 on a top surface 58 of lower substrate 44, and underlies a conductor 60 on a bottom surface 62 of upper substrate 40. A conductive element 64 is entrapped within opening 46. When in the upright orientation 26 depicted in FIG. 1, conductive element 64 rests on lower substrate 44 and shorts conductor 56 to conductor 54. As tilt sensor apparatus 36 is tilted past angle 34 (FIG. 1) for tilt sensors 42' and past angle 30 (FIG. 1) for tilt sensor 42", conductive elements 64 move under the influence of gravity 27 (FIG. 1), where they come to rest on upper substrate 40 and short the respective instances of conductors 60 to conductor 54.

In the preferred embodiment, conductive element 64 is desirably shaped substantially in the form of a sphere so that it may freely roll along conductors 54, 56, and 60 as tilt sensor apparatus 36 is tilted. One or more of conductive elements 64 in tilt sensor apparatus 36 may be constructed from a magnetic material so that a magnetic field may be applied to tilt sensor apparatus 36 to force one or more tilt sensors 42 into known states, regardless of tilt angle. But the use of a magnetic conductive element 64 is not a requirement and may desirably be omitted in applications where it is beneficial that tilt sensor 36 be insensitive to magnetic fields. In the preferred embodiments, conductive element 64 is desirably gold plated to improve the likelihood of making shorting contacts between pairs of conductors 54/56 and 54/60 and to reduce false-open errors.

In accordance with conventional PWB manufacturing techniques, opening 46 and conductive element 64 are desirably maintained as clean as reasonably possible during the manufacturing process, without employing the more expensive clean-room techniques. Thus, some small amount of contamination may be present with conductive element 64 in opening 46. In order to minimize the likelihood of such contamination preventing the shorting of pairs of contacts 54/56 and 54/60 and to reduce false-open errors, it is desirable that the kinetic energy of conductive element 64 be as high as reasonably possible when conductive element 64 impacts contact pair 54/56 and contact pair 54/60.

Kinetic energy may be increased by making the distance conductive element 64 can travel within opening 46 as large as possible. Thus, in the preferred embodiment, the thickness of middle substrate 38, which controls this distance, is desirably more than three times the radius of conductive element 64, causing conductive element to move a distance of greater than its radius between positions where it makes contact with contact pair 54/56 and with contact pair 54/60. In other words, the diameter of conductive element 64 is less than ⅔ of the thickness of middle substrate 38. In the preferred embodiment, the diameter of conductive element 64 is around 1.5 mm and middle substrate 38 is around 2.4 mm thick. While conductive element 64 may be reduced in size in alternate embodiments, such reduction in size reduces the mass and therefore the kinetic energy of conductive element 64 as it makes contact. And, the costs of being required to handle, manipulate, and track smaller items can increase manufacturing costs.

Tilt sensor apparatus 36 is an electrical device, which is powered by a battery 66 in the preferred embodiment. In the preferred embodiment, battery 66 is a single, non-replaceable, coin or button type of lithium battery with a smallest dimension 68 of its height at less than 8 mm, and at around 3.3 mm in the currently most-preferred embodiment. Battery 66, though small when compared to other batteries, may be larger than other electrical components associated with tilt sensor apparatus 36 and with asset tag 24 (FIG. 1). To the extent that battery 66 is needed to power the electrical circuits associated with tilt sensor apparatus 36, space is also provided to accommodate battery 66. In the preferred embodiment, the same space needed to accommodate the height of battery 66 is used by middle substrate 38 so that no additional height need be provided to accommodate the mechanical features of tilt sensor apparatus 36. In other words, middle substrate 38 is vertically aligned with battery 66. The vertical alignment of middle substrate 38 with battery 66 causes the mechanical features of tilt sensor apparatus 36 to occupy no more vertical height than battery 66 and prevents tilt sensor apparatus 36 from extending in height beyond other electrical components that may be associated with tilt sensor apparatus 36. Moreover, the amount of height available to middle substrate 38 due to its vertical alignment with battery 66 allows opening 46 to be sufficiently long to permit conductive element 64 to travel farther than its radius to short contact pairs 54/56 and 54/60.

Battery 66 is configured to have a negative polarity terminal 70 on its top side and a positive polarity terminal 72 on its bottom side. One or more electrical components 74 associated with tilt sensor apparatus 36 are mounted on a top side of upper substrate 40. Electrical components 74 electrically couple to both of the opposite polarity battery terminals 70 and 72. In the preferred embodiment, negative terminal 70 directly contacts conductor 60 on bottom surface 62 of upper substrate 40, where it is coupled to the top surface of upper substrate 40 through plated feed-throughs 76 and to electrical components 74 via conductors 78 on the top surface of upper substrate 40.

A thin, conductive, metallic spring plate 80 is positioned underneath battery 66 in contact with positive terminal 72 and has members which push battery 66 upward to hold negative terminal 70 in contact with conductor 60 on bottom surface 62 of upper substrate 40. Although not shown, portions of a rigid housing reside both underneath spring plate 80 and above upper substrate 40 so that spring plate 80, battery 66, and upper substrate 40 are clamped to one another within the housing by spring plate 80.

Spring plate 80 extends laterally beyond battery 66, underneath middle substrate 38 and lower substrate 44. Spring plate 80 also has fingers that push lower substrate 44 and middle substrate 38 upward toward upper substrate 40. This causes middle substrate 38 to be clamped in place between lower substrate 44 and upper substrate 40. This clamping causes middle substrate 38 to be closely positioned immediately over lower substrate 44 and closely positioned immediately under upper substrate 40. Desirably, middle substrate 38 is spaced apart from lower substrate 44 and from upper substrate 40 by distances of no more than the thicknesses of conductors 56 and 60 on substrates 44 and 40, respectively, plus any conductor which may be on top and bottom surfaces 50 and 48 of middle substrate 38.

Spring plate 80 also contacts pads 82 located on the bottom of lower substrate 44, which electrically couple to pads 84 located on top surface 58 of lower substrate 44 by feed-throughs 86. Pads 84 are formed from conductor 56, and are in physical contact with pads 88 formed on bottom surface 48 of middle substrate 38. Pads 88 electrically couple to pads 90 on upper surface 50 of middle substrate 38 by feed-throughs 92, and pads 90 are in physical contact with pads 94 on bottom surface 62 of upper substrate 40. Pads 94 are formed in conductor 60. Pads 94 electrically couple to pads 96 on the top side of upper substrate 40 by feed-throughs 98 and to electrical component 74. Accordingly, electrical component 74 is electrically coupled to negative terminal 72 of battery 66 by being electrically coupled through middle substrate 38, which simultaneously serves to provide openings 46 for tilt sensor apparatus 36. Tilt sensor apparatus 36 is formed using the same components that provide an electrical connection to the far side of battery 66 for additional space savings. Although not specifically shown in the figures, conductor 54 on opening wall 52 may alternatively be used to electrically couple one of battery terminals 70 and 72 to the electrical component 74.

As shown in FIG. 2, middle substrate 38 has a thin central region. Lower substrate 44 has a similar shape. These thin central regions allow lower and middle substrates 44 and 38 to flex. Consequently, four or more conductive paths similar to the conductive paths formed using feed-throughs 86, 92, 98 may be formed through lower and middle substrates 44 and 38 to upper substrate 40. Not all of these conductive paths are required to directly couple to one of battery terminals 70 and 72. Any less-than-perfect planar unevenness between the substrates may be accommodated by flexure of lower and middle substrates 44 and 38 under the upward force provided by spring plate 80. Consequently, adequate electrical contacts can be provided for more than three vertical conductive paths due to the flexure of lower and middle substrates 44 and 38.

Conductors 56 and 60 are preferably provided by thin conductive layers on lower and upper substrates 44 and 40, respectively. The thicknesses of these conductive layers are exaggerated in the figures. In the preferred embodiment, conventional techniques, such as etching, are used to remove portions of conductors 56 and 60 and pattern conductors 56 and 60 into desired shapes, where some of the shapes in each conductor 56 and 60 are electrically isolated from one another.

Figure 5:
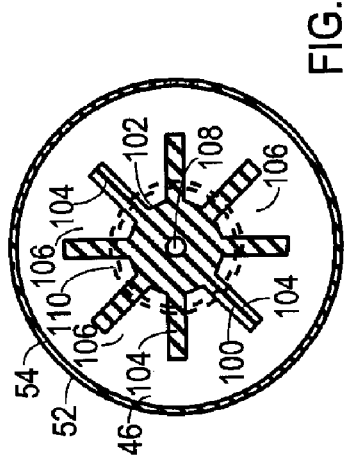
FIG. 5 shows a conductive star pattern which is used on upper and lower substrates in the tilt sensor apparatus of FIG. 2.

FIG. 5 shows a conductive star pattern 100. Star patterns 100 are used on lower and upper substrates 44 and 40 in tilt sensor apparatus 36. Star pattern 100 is electrically isolated from other patterns that may be formed in the conductive layers that provide conductors 56 and 60. In particular, star pattern 100 has a central conductive region 102 from which a plurality of elongated conductive regions 104 radially extend. Insulating void regions 106 reside between adjacent pairs of elongated conductive regions 104. A feed-through 108 provides an electrically conductive path to the opposite side of the substrate on which star pattern 100 is formed.

FIG. 5 also depicts the outline of opening wall 52 and of conductor 54 thereon relative to star pattern 100. Star pattern 100 fits within the central portion of opening 46, which is surrounded by wall 52, but does not extend to wall 52. In particular the conductive layers that provide conductors 56 and 60 are absent where opening wall 52 most closely approaches lower and upper substrates 44 and 40, respectively. Due to this absence of conductors 56 and 60 in this region, electrical shorting between conductor 54 and star patterns 100 should occur only through the operation of conductive element 64.

FIG. 5 also depicts an annular tangential-contact band 110. Tangential-contact band 110 is the portion of star pattern 100 which is contacted by contact element 64 when contact element 64 is also in contact with conductor 54 on opening wall 52. Tangential-contact band 110 desirably intersects each of elongated conductive regions 104 and does not extend to central conductive region 102. Elongated conductive regions 104 may, but need not, extend radially farther toward opening wall 50 than tangential-contact band 110 because conductive element 64 is blocked from making contact outside of tangential-contact band 100 by conductor 54 on opening wall 52.

Figure 6:
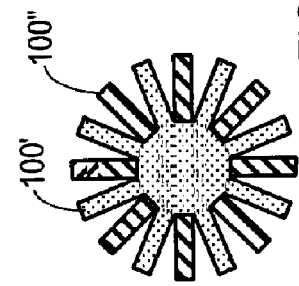
FIG. 6 shows juxtaposed conductive star patterns from top and bottom substrates.

FIG. 6 shows juxtaposed conductive top and bottom star patterns 100' and 100" for an individual tilt sensor 42'. Referring to FIGS. 2, 3, and 6, top and bottom star patterns 100' and 100" are formed on top and bottom substrates 40 and 44 from conductors 60 and 56, respectively. Star patterns 100' and 100" are positioned at opposing ends of opening 46. Star patterns 100' and 100" are also rotated relative to one another so that elongated conductive regions 104 of top star pattern 100' overlie void regions 106 of bottom star pattern 100", and void regions 106 of top star pattern 100' overlie elongated conductive regions 104 of bottom star pattern 100". In the preferred embodiment, eight elongated conductive regions 104 are provided and equally distributed around central conductive region 102 in approximately 45° increments. Top star pattern 100' is rotated relative to bottom star pattern 100" approximately one-half of this increment (i.e., 22.5°). This rotation is provided so that conductive element 64 traverses a more complex path in moving between star patterns 100. The more complex path provides greater opportunities for conductive element 64 to encounter and dislodge minute particles of contamination that may be present in opening 46, providing a greater likelihood of making a shorting contact between contact pairs 54/56 and 54/60 and reducing the likelihood of false-open errors.

Figure 7:
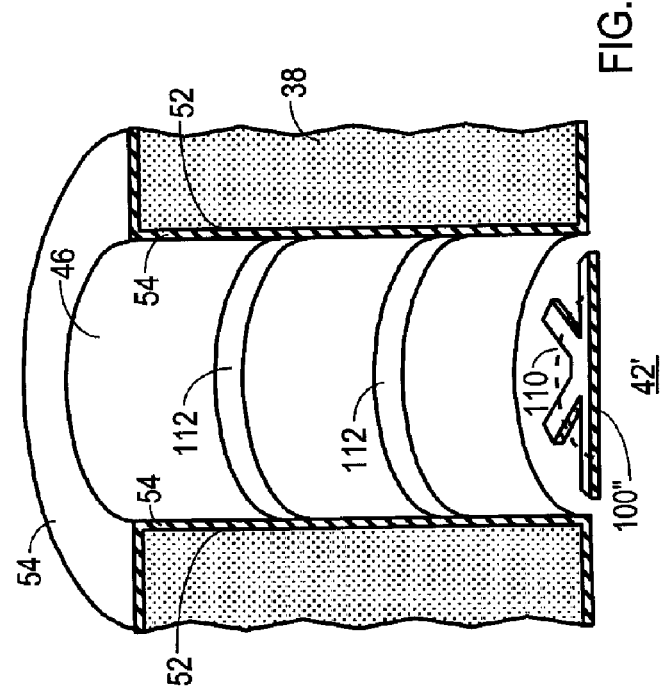
FIG. 7 shows a cut-away view of a cavity around which a single tilt sensor from the tilt sensor apparatus of FIG. 2 is formed.

FIG. 7 shows a cut-away view of cavity 46 around which a single tilt sensor 42' from the tilt sensor apparatus 36 is formed. FIG. 7 illustrates that in the preferred embodiment, annular tangential-contact bands 112 are continuously occupied by conductor 54 and do not exhibit a pattern of void and conductive regions. Annular tangential-contact bands 112 represent the regions of opening wall 52 and conductor 54 where conductive element 64 makes contact when also resting on a star pattern 100 of a substrate 40 or 44. By making conductor 54 continuously occupy tangential-contact bands 112, tilt sensor 42' provides a more stable output. Mere movement that is not a tilting movement has less likelihood of producing a spurious output that might lead to a false-open condition.

In addition, in the preferred embodiment, the entirety of opening wall 52 is continuously occupied by conductor 54, and conductor 54 may extend both on top of top surface 50 of middle substrate 38 and beneath bottom surface 48 of middle substrate 38. This configuration electrically shorts contact bands 112 together. As discussed below, the shorting between contact bands 112 poses no problem in the preferred embodiment. The continuous occupation of opening wall 52 by conductor 54 is also compatible with conventional PWB manufacturing processes for plated-through holes and is extremely inexpensive. Those skilled in the art will appreciate that the thickness of conductor 54 is exaggerated in the figures. The use of an individual tilt sensor 42' structure that results from an inexpensive process enables tilt sensor apparatus 36 to include as many tilt sensors 42 as may be beneficial to the application in which tilt sensors are being provided. While FIG. 7 depicts only tilt sensor 42', tilt sensor 42" (FIG. 4) and/or other tilt sensors 42 that may sense still other angles are desirably configured in a similar manner.

FIG. 4 depicts annular tangential-contact bands 112 for tilt sensor 42". As shown in FIG. 4, walls 52 extend between top surface 50 of middle substrate 38 and bottom surface 48 of middle substrate 38 at a different angle (e.g., 45° or 135°, depending on the reference) from the perpendicular depictions of FIGS. 2 and 7. That different angle permits tilt sensor 42" to sense orientation 28 (FIG. 1) while tilt sensors 42' collectively sense orientation 32 (FIG. 1). But there is no need for walls 52 to maintain this angle outward from annular tangential-contact bands 112 because conductive element 64 makes no contact with walls 52 in this outer region. Thus, FIG. 4 shows that a portion of walls 52 may exhibit a different angle, such as perpendicular, to save space that otherwise might be required on bottom surface 48 of middle substrate 38. The portion of walls 52 residing between annular tangential-contact bands 112 causes opening 46 to exhibit a frusto-conical shape within annular tangential-contact bands 112 for tilt sensors 42 that sense tilt angles other than 90°.

Moreover, in the preferred embodiment, the frusto-conical shape of opening 46 in tilt sensor 42" and the cylindrical shape of opening 46 for tilt sensors 42' are substantially symmetrical about their axes, which allow each of tilt sensors 42 in the preferred embodiment to sense a solid tilt angle. In other words, tilt sensor apparatus 36 senses the same tilt angles, whether the angles are to the left, right, forward, or backward from upright orientation 26 (FIG. 1).

In the preferred embodiment, opening 46 in the vicinity of annular tangential-contact bands 112 has a minimum diameter 114 that is 1.25 times greater than the diameter of contact element 64. Thus, for the preferred embodiment with a 1.5 mm diameter conductive element 64, opening 46 at annular tangential-contact bands 112 exhibits at least a 1.875 mm diameter, and more preferably exhibits around a 2.25 mm diameter. This diameter for opening 46 gives contact element 64 sufficient room to freely move within opening 46 and allows annular tangential-contact band 110 (FIG. 5) to traverse both elongated conductive regions 104 and void regions 106 in star patterns 100.

But there is no need for opening 46 to observe the minimum diameter outside of annular tangential-contact bands 112, and opening 46 at top surface 50 of middle substrate 38 may very well exhibit a somewhat smaller diameter to save space on top surface 50 or to ease manufacturing processes.

Figure 8:
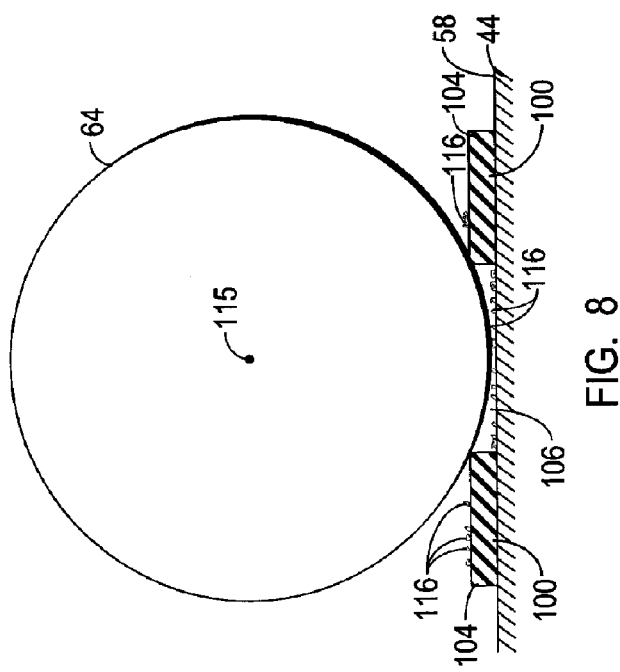
FIG. 8 shows a side view of a spherical conductive element juxtaposed with conductive traces.

FIG. 8 shows a exaggerated side view of a spherical conductive element 64 juxtaposed with elongated conductive regions 104 and void regions 106 of a star pattern 100. FIG. 8 applies to either top star pattern 100' or bottom star pattern 100". Referring to FIGS. 4, 7, and 8, conductive element 64 is urged to come to rest within opening 46 when a contact point 115 on the surface of conductive element 64 contacts conductor 54 in an annular tangential-contact band 112. In addition, conductive element 64 comes to rest on edges of two, adjacent elongated conductive regions 104, with a portion of conductive element extending into the void region 106 between the two adjacent elongated conductive regions 104. While the outside of conductive element 64 dips into void region 106, it avoids contact with surface 58 or 62 of the respective lower or upper substrate 44 or 40. Thus, conductive element 64 contacts two points on the star pattern 100. In order for this arrangement to result, the thicknesses of the conductive layers from which elongated conductive regions 104 are patterned are mutually dimensioned with the diameter of conductive element 64, and with the diameter of opening 46 which establishes the location of annular tangential contact band 110.

By having conductive element 64 rest on two points in star pattern 100, the chances of making a successful electrical contact are improved over a design that achieved contact at only one point. Moreover, contamination 116 tends to have more difficulty adhering to the edges of elongated conductive regions 104 than in the flat portions of conductors 56 or 60, and contamination 116 is easily dislodged from the edges by the movement of conductive element 64. The use of the edges of elongated conductive regions 104 to make contact with conductive element 64 also promotes good electrical contact between conductive regions 104 and conductive element 64 because the edges are more immune to contamination 116.

Figure 9:
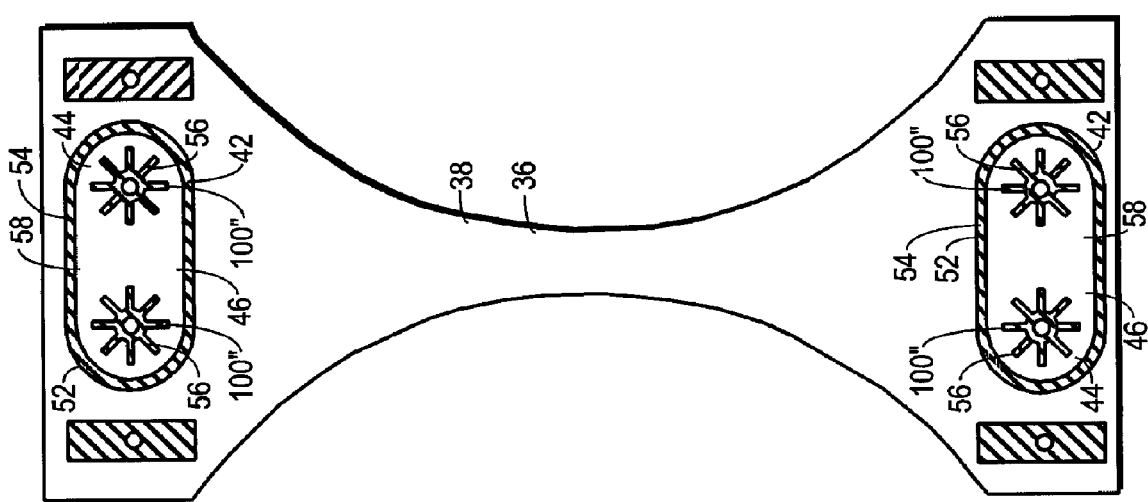
FIG. 9 shows a top view of middle substrate for an alternate embodiment of a tilt sensor apparatus configured in accordance with the teaching of the present invention.

FIG. 9 shows a top view of middle substrate 38 for an alternate embodiment of a tilt sensor apparatus 36 configured in accordance with the teaching of the present invention. In particular, tilt sensor apparatus 36 includes two tilt sensors 42. The two tilt sensors 42 are coupled in parallel as were tilt sensors 42', discussed above, but each tilt sensor 42 senses a 0° tilt angle in this embodiment. The embodiment of FIG. 9 may be useful for attachment to a tap handle which is at a slightly negative tilt angle when the tap is closed and at a positive angle when dispensing a beverage.

In the FIG. 9 embodiment, opening 46 is horizontally elongated so that conductive element 64 may travel a considerable horizontal distance. In addition, two of star patterns 100" formed from conductor 56 are each located on top surface 58 of lower substrate 44 and spaced apart from one another by a distance that prevents contact element 64 (FIG. 3) from contacting both of star patterns 100" simultaneously. Additional star patterns 100' may, but are not required to, be located on bottom surface 62 of upper substrate 40 (FIG. 3). Intra-substrate conductor 54 resides on opening wall 46 as discussed above in connection with FIGS. 2–8, and the other features of this alternative embodiment are also substantially as described above in connection with FIGS. 2–8.

When tilt sensor apparatus 36 is tilted at a negative angle, conductive element 64 shorts one of star patterns 100" formed from conductor 56 to intra-substrate conductor 54. When tilt sensor apparatus 36 is tilted at a positive angle, conductive element 64 rolls to the other side of elongated opening 46, where it then shorts the other of star patterns 100" formed from conductor 56 to intra-substrate conductor 54.

In still other embodiments (not shown), star patterns 100 may be omitted from one side of opening 46. For example, when two tilt sensors 42' are coupled in parallel, then top star pattern 100' may be omitted from one opening while bottom star pattern 100" may be omitted from the other. Some reliability may be sacrificed in this embodiment, but the redundancy achieved from operating two tilt sensors 42' in parallel allows the same basic functionality to be provided. Even when tilt sensors 42 are not coupled in parallel, one of the star patterns 100 may be omitted. For example, in the embodiment discussed above in connection with FIGS. 2–8, bottom star pattern 100" may be omitted from tilt sensor 42". The functionality is somewhat different, but the difference may be of little importance in applications where other tilt sensors, such as tilt sensors 42' are present.

Figure 10:
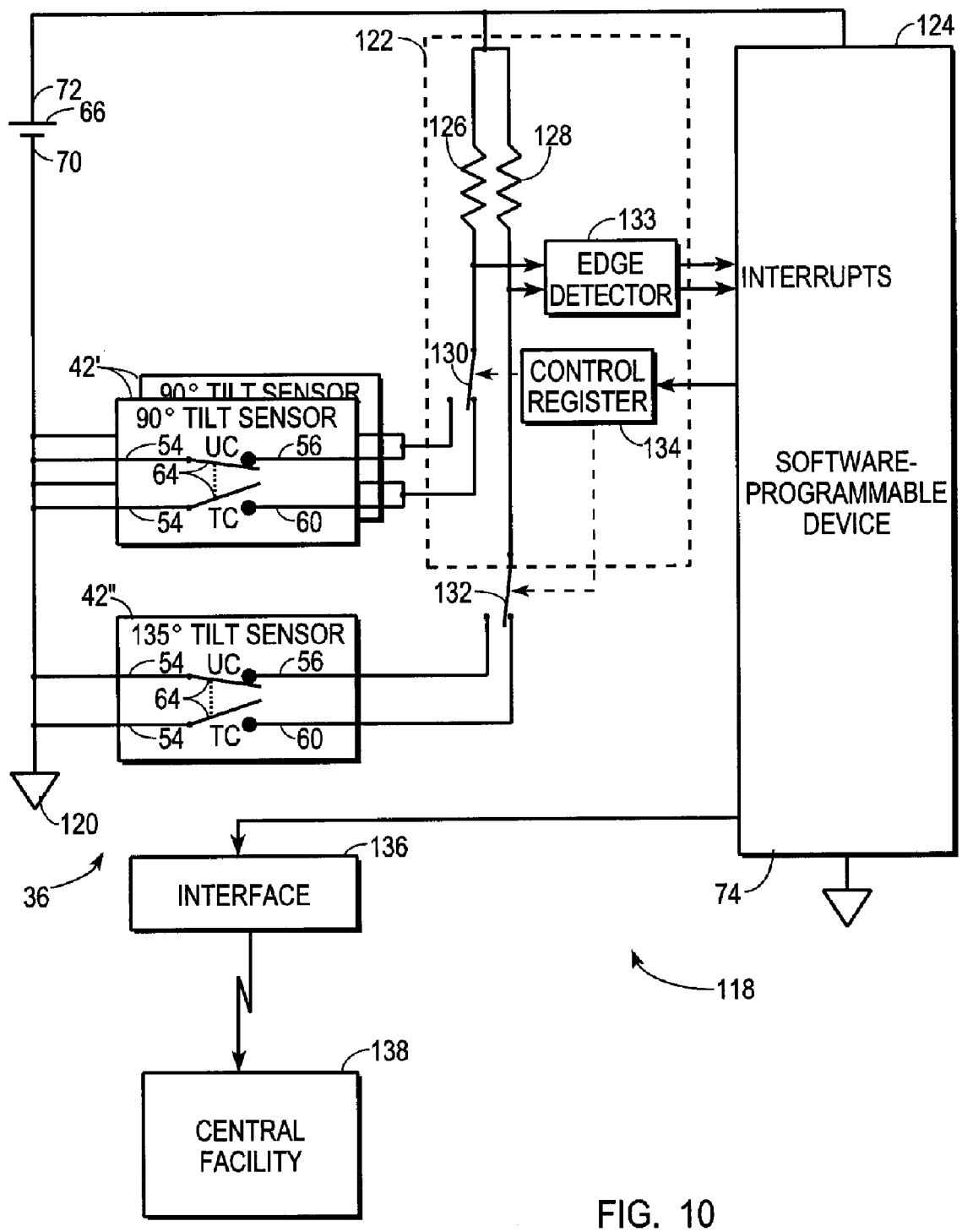
FIG. 10 shows a schematic block diagram of a device which includes the tilt sensor apparatus of FIG. 2 or 9.

FIG. 10 shows an exemplary schematic block diagram depicting a device 118, such as an asset tag 24, which includes a tilt sensor apparatus 36 configured generally as discussed above in connection with FIGS. 2–9. FIG. 10 shows that exemplary device 118 includes two 90° tilt sensors 42' and one 135° tilt sensor 42", but it might alternatively or additionally include 0° tilt sensors. In the preferred embodiment, the mechanical features of tilt sensors 42' and 42" are similar to those discussed above in connection with FIGS. 2–9. For convenience, FIG. 10 schematically depicts each tilt sensor 42 somewhat like a double-pole switch. One pair of contacts, i.e., contact pair 54/56, is closed or shorted when device 118 is upright. This pair of contacts is labeled "UC" in FIG. 10. Another pair of contacts is provided by contact pair 54/60. Contact pair 54/60 is open when device 118 is upright, but closed or shorted when device 118 is tilted beyond the tilt sensor's angle. This pair of contacts is labeled "TC" in FIG. 10.

Conductors 54 from all tilt sensors 42 and negative terminal 70 from battery 66 couple to a terminal 120 adapted to receive a common potential, referred to hereinafter as ground. Thus, the shorting together of annular tangential-contact bands 112 (FIG. 7) by conductor 54 continuously occupying the entirety of opening wall 52 poses no problem because the configuration of device 118 depicted in FIG. 10 does not require separate pairs of contacts in any of tilt sensors 42.

Positive terminal 72 of battery 66 couples to an input/output (I/O) section 122 and to a software-programmable device 124. Within I/O section 122, power-consuming elements 126 and 128, shown in FIG. 10 as pull-up resistors, respectively couple to first ports of controllable switching elements 130 and 132 and through an asynchronous edge detector circuit 133 to interrupt inputs of software-programmable device 124. Edge detector circuit 133 allows brief (e.g., less than 1 microsecond), spurious indications of tilt or no-tilt conditions to be captured and to cause an interrupt for software-programmable device 124.

A second port of switching element 130 couples to the star patterns 100" formed from conductor 56 for each of tilt sensors 42', and a second port of switching element 132 couples to the star pattern 100" formed from conductor 56 for tilt sensor 42". A third port of switching element 130 couples to the star patterns 100' formed from conductor 60 for each of tilt sensors 42', and a third port of switching element 132 couples to the star pattern 100' formed from conductor 60 for tilt sensor 42". A control register 134 receives data from software-programmable device 124 and provides control outputs which operate switching elements 130 and 132. Thus, switching elements 130 and 132 selectively couple their first ports to their second or third ports under the control of data provided by software-programmable device 124.

A data or I/O output of software-programmable device 124 also couples to an interface circuit 136, through which data are communicated to a central facility 138. Interface circuit 136 may implement any electronic communication scheme, including radio-frequency schemes, bidirectional schemes, optical schemes, infrared schemes, inductive schemes, capacitive schemes, acoustic schemes, magnetic schemes, and schemes based on direct physical connection between contacts in device 118 and another device which may serve as central facility 138 or which may transport data to central facility 138. Any of the numerous types of computer and data processing devices known to those skilled in the art may serve as central facility 138, regardless of location. Central facility 138 may be distributed so as to provide functions that are performed at different devices, and such devices may or may not be remotely located from one another or from device 118.

Figure 11:
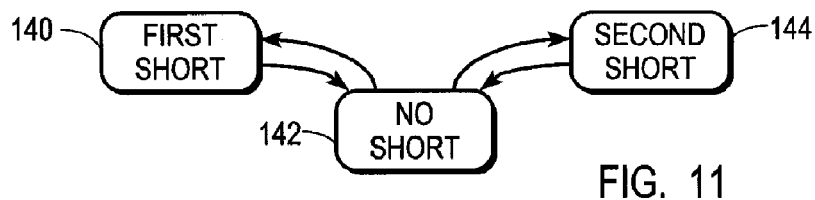
FIG. 11 shows a state diagram which characterizes any tilt sensor from the tilt sensor apparatus of FIG. 2 or FIG. 9.

FIG. 11 shows a state diagram which characterizes the operation of any single tilt sensor 42 from tilt sensor apparatus 36. In particular, FIG. 11 indicates that tilt sensor 42 may exist at any given moment in any one of three states, including a first-short state 140, a no-short state 142, and a second-short state 144. First-short state 140 occurs when conductive element 64 shorts conductor 54 to conductor 60, and second-short state 144 occurs when conductive element 64 shorts conductor 54 to conductor 56. No-short state 142 occurs whenever conductive element 64 fails to produce a short at either the contact pair 54/60 or contact pair 54/56. FIG. 11 indicates that tilt sensor 42 may transition from first-short state 140 to no-short state 142, and vice-versa, or tilt sensor 42 may transition from no-short state 142 to second-short state 144, and vice-versa, but tilt sensor 42 may not transition directly between first-short state 140 and second-short state 144, or vice-versa. Tilt sensor 42 may not transition between first-short state 140 and second-short state 144 because of the large distance conductive element 64 needs to travel between the opposing ends of opening 46.

Tilt sensor 42 may spend a considerable amount of time in no-short state 142, and the instances of no-short state 142 may occur at any time whether or not a tilt is in progress. But, in order for tilt sensor 42 to provide a stable and reliable indication of tilt, it is desirable that no-short state 142 be substantially ignored. That way, tilt sensor 42 is much less sensitive to mere movement but reliably senses tilts.

Figure 12:
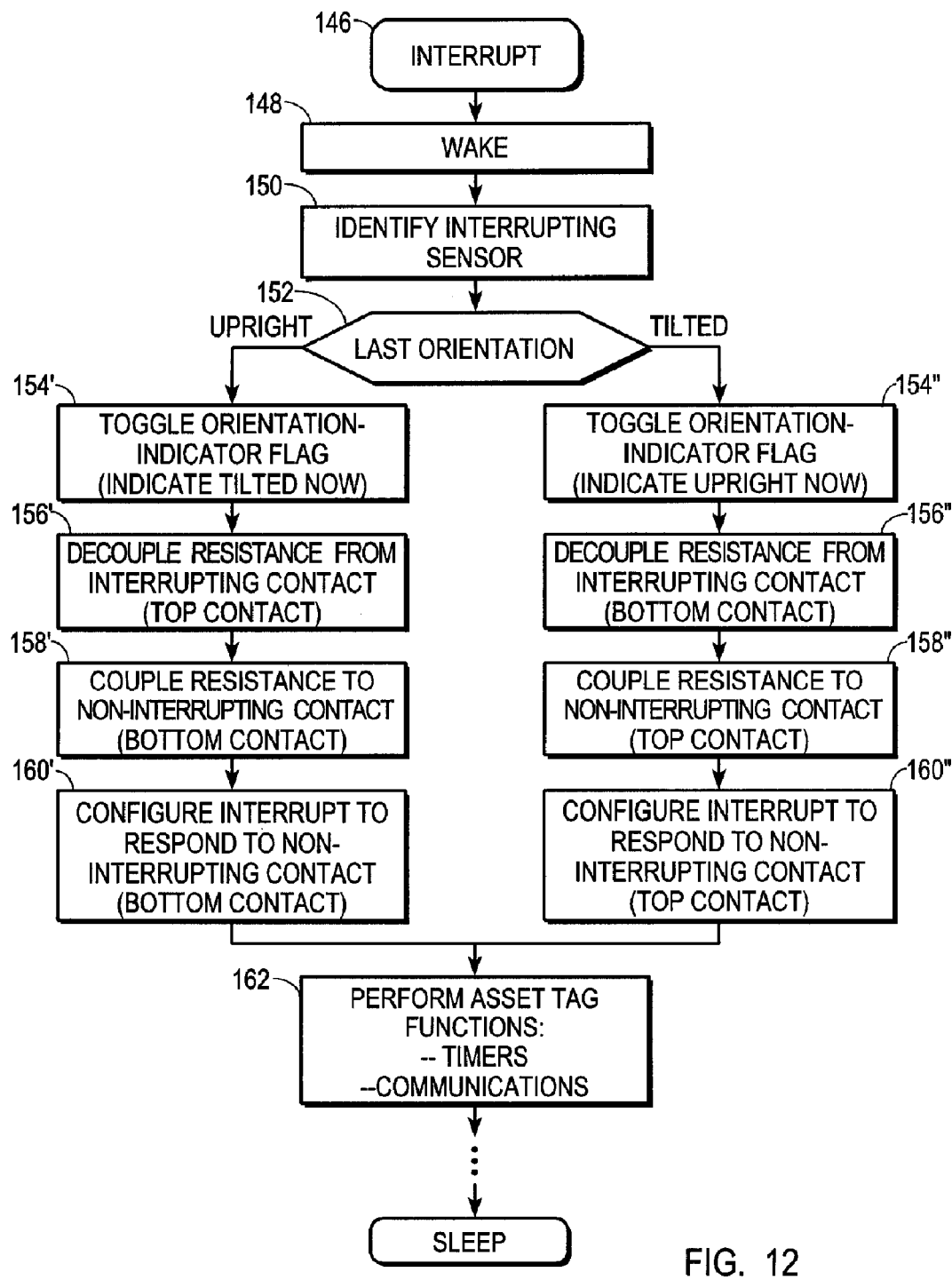
FIG. 12 shows a flow chart of a process the device of FIG. 10 performs in connection with the tilt sensor apparatus of FIG. 2 or 9.

FIG. 12 shows a flow chart of a process 146 that device 118 follows under the control of software-programmable device 124. Referring to FIGS. 10–12, in the preferred embodiment software-programming device 124 may be provided by any of a wide variety of microcontrollers, microprocessors, or the like. In a manner well understood by those skilled in the art, software-programming device 124 is configured to respond to programming instructions which are stored in a memory portion (not shown) of software-programming device 124.

Process 146 is configured to be invoked upon the occurrence of an interrupt. Those skilled in the art will appreciate that an interrupt may cause software-programmable device 124 to cease any process currently being executed and execute programming instructions provided for the interrupt. In the preferred embodiment, software-programmable device 124 is desirably in a sleep mode prior to the receipt of an interrupt. A sleep mode represents a lower power mode of operation where software-programmable device 124 performs reduced levels of activity. The sleep mode may be contrasted with an awake mode, where software-programmable device 124 engages in increased levels of activity and consumes more power.

Also prior to an interrupt, switching elements 130 and 132 are controlled so that power-consuming elements 126 and 128 are coupled to the contact pair of each tilt sensor 42 that must be open in a currently-indicated orientation for device 118. In upright orientation 26, the TC pair must be open and the UC pair may be either shorted or open. In a tilted orientation, the UC pair must be open and the TC pair may be either shorted or open. Accordingly, power-consuming elements 126 and 128 consume substantially no power because the open contact pair to which they couple does not conduct substantial amounts of current. Likewise, the closed contact pair does not conduct substantial amounts of current because power-consuming elements 126 and 128 are decoupled from those contact pairs due to the operation of switching elements 130 and 132.

Prior to an interrupt, power-consuming elements 126 and 128 hold the interrupt inputs in a known condition (e.g., a logical high state). An interrupt occurs when device 118 is tilted so that the open contact pair of a tilt sensor 42 is shorted by its conductive element 64. When the short occurs, the corresponding power-consuming element 126 or 128 then conducts current through the shorted contact pair to ground terminal 120 and consumes significantly more power.

When an interrupt occurs, process 146 first performs a task 148 to cause software-programmable device 124 to enter its awake mode. In the preferred embodiment, task 146 is completed within 100 microseconds following a short in an contact pair. Task 146 may be implemented by hardware rather than software in a manner understood by those skilled in the art. After task 148, a task 150, which may be performed either by hardware or software, identifies the interrupting tilt sensor 142. For the exemplary embodiment depicted in FIG. 10, an interrupt may be generated by either the 90° tilt sensors 42' coupled in parallel or by 135° tilt sensor 42". Subsequent tasks may be identical but for the identity of the interrupting sensor 42, regardless of which sensor 42 is identified in task 150.

Following task 150, a query task 152 determines which orientation was last indicated by process 146 for the subject sensor. While the subsequent tasks may be identical regardless of the last-indicated orientation, FIG. 12 depicts two distinct program flow paths for ease of understanding. A task 154' or 154" is then performed to toggle an orientation-indication flag, which causes process 146 to now indicate a tilted state if the previous state was upright, or to indicate an upright state if the previous state was tilted. Thus, unlike tilt sensor 42 which exists in three states, the orientation indicator exhibits only two states, each of which is the inverse of the other.

Following task 154, a task 156' or 156" decouples the associated power-consuming element 126 or 128 from the circuit path of the interrupting contact pair. Due to this decoupling, the subject power-consuming element 126 or 128 no longer consumes a significant amount of power. Thus, power-consuming elements 126 and 128 consume significant amounts of power only briefly and only from the instant when a short first occurs at a given contact pair until task 156 is performed. When the previous orientation was upright and the current orientation is now indicated as being tilted, the power-consuming element 126 or 128 is decoupled from the contact pair 54/60. When the previous orientation was tilted and the current orientation is now indicated as being upright, the power-consuming element 126 or 128 is decoupled from contact pair 54/56.

Following task 156, a task 158' or 158" is performed to couple the associated power-consuming element 126 or 128 to the circuit path of the non-interrupting contact pair in the subject tilt sensor 42. This circuit path now has an open contact pair, and the power-consuming element 126 or 128 does not consume a significant amount of power. When the previous orientation was upright and the current orientation is now indicated as being tilted, the power-consuming element 126 or 128 is coupled to contact pair 54/56. When the previous orientation was tilted and the current orientation is now indicated as being upright, the power-consuming element 126 or 128 is coupled to contact pair 54/60.

Next, an optional task 160' or 160" configures, if necessary, the interrupt structure of software-programmable device 124 to respond in the future to the non-interrupting contact pair of the subject tilt sensor 42, but not to respond to the interrupting contact pair. Task 160 may not strictly be necessary in the embodiment depicted in FIG. 10 because the decoupling and coupling of power-consuming elements 126 or 128 above in tasks 156 and 158 accomplish this function. When the previous orientation was upright and the current orientation is now indicated as being tilted, the non-interrupting contact pair is contact pair 54/56. When the previous orientation was tilted and the current orientation is now indicated as being upright, the non-interrupting contact pair is contact pair 54/60. At this point device 118 is set-up to monitor the non-interrupting contact pair for a future interrupt. The orientation-indicator flag will continue to indicate its current state (either first-short state 140 or second-short state 144) regardless of any excursions into and back from no-short state 142.

Following task 160, a task 162 is performed to perform any asset tag 24 or other functions that may be useful to the application for which device 118 is provided. For the asset tag 24 application, software timers are initiated and disabled upon the detection of entry into and exit from orientations 28 and 32 (FIG. 1). These orientations are indicated by the orientation-indicator flags discussed above. And, from time to time various communication functions are performed to cause data describing the durations asset tag 24 spends in orientations 28 and 32 to be sent to central facility 138. These and other functions may be performed during task 162. As indicated by ellipsis in FIG. 12, any number of additional tasks may be performed by device 118 as may be desired for the application. But, eventually device 118 completes such tasks and enters its lower power sleep mode, at which point process 146 is considered complete.

Accordingly, I/O section 122 and software-programmable device 124 (FIG. 10) collectively form a control circuit configured to continuously indicate an upright orientation 26 until first-short state 140 is detected, then indicate a tilted orientation 28 or 32, and to continuously indicate the tilted orientation until the a second-short state 144 is detected, then to indicate upright orientation 26 again.

While software-programmable device 124 may be provided by a wide variety of microcontrollers and microprocessors, both I/O section 122 and software-programmable device 124 may also be implemented using a single component, which is indicated as electrical component 74 in FIG. 2. In one embodiment a PIC16F630 or similar microcontroller manufactured by Microchip Technology, Inc. of Chandler, Ariz., USA, serves as both I/O section 122 and software-programmable device 124. In this embodiment, instead of switching a single power-consuming element between two different circuit paths, separate pull-up elements are switched in to and out from different circuit paths. And, separate circuit paths are provided to separate I/O pins that also serve as interrupts. Those skilled in the art will appreciate that it makes no difference whether the same or different power-consuming elements are coupled into and out from the various circuit paths and whether a larger or smaller number of physical interrupt pins are used.

In summary, the present invention provides an improved tilt sensor apparatus and method therefor. The tilt sensor apparatus may include one or more tilt sensors. The tilt sensor apparatus consumes very little power due, at least in part, to the coupling and decoupling of power-consuming elements to and from circuit paths that pass through the tilt sensors and the use of an interrupt to wake a software-programmable device from a sleep mode when a sensed tilt angle is detected. The tilt sensor apparatus requires little space due, at least in part, to the alignment of an opening in which a conductive element is entrapped with a battery and/or the removal of tilt sensors from the surface of a printed wiring board (PWB) on which other circuit components are mounted. The tilt sensor apparatus is also inexpensive to manufacture because it uses a single inexpensive component in the form of a conductive element along with features formed in PWBs using conventional PWB processing techniques. And, the tilt sensor apparatus provides a reliable and robust indication of tilt angles due to the coupling of tilt sensors in parallel, the use of a control circuit which is insensitive to a no-short state, and the use of mechanical features that increase kinetic energy in the conductive element and which form reliable contacts with stationary conductors.

Although preferred embodiments of the invention have been illustrated and described in detail, it will be readily apparent to those skilled in the art that various modifications may be made therein without departing from the spirit of the invention or from the scope of the appended claims. For example, while a specific embodiment related to an asset tag having particular requirements is disclosed herein, tilt sensor apparatuses configured in accordance with the teaching provided herein may be used in a wide variety of different applications, and those tilt sensors may be configured to sense different angles than those disclosed herein. Moreover, those skilled in the art may devise equivalent tilt sensor apparatuses with different dimensions than described above. These and other changes and modifications are intended to be included in the scope of the present invention.

What is claimed is:

1. A tilt sensor apparatus (36) comprising:
   a first planar substrate (44) having a top surface (58) on which a first conductive layer (56) resides, said first conductive layer being formed into a bottom pattern (100") having alternating conductive regions (104) and void regions (106), wherein said conductive regions of said bottom pattern are electrically coupled together;
   a second planar substrate (38) overlying said top surface of said first substrate, said second substrate having an opening (46) overlying said pattern and surrounded by an opening wall (52) and having a intra-substrate conductor (54) on said opening wall, said intra-substrate conductor continuously occupying an annular tangential-contact band (112) in said opening wall;
   a third planar substrate (40) having a bottom surface (62) on which a third conductive layer resides (60), said third substrate overlying said second substrate; and
   a conductive element (64) positioned within said opening and configured to move within said opening to short said first conductive layer to said intra-substrate conductor when resting on said first substrate and in contact with said annular tangential-contact band.

2. A tilt sensor apparatus as claimed in claim 1 wherein:
said third conductive layer is formed into a top pattern (100') having alternating conductive and void regions, wherein said conductive regions of said top pattern are electrically coupled together;
said annular tangential-contact band is a first annular tangential-contact band; and
said intra-substrate conductor continuously occupies a second annular tangential-contact band in said opening wall, said second annular tangential-contact band being positioned on said opening wall where said conductive element most nearly touches said opening wall when resting on said third substrate.

3. A tilt sensor apparatus as claimed in claim 2 wherein said top pattern is positioned relative to said bottom pattern so that said elongated conductive regions of said top pattern overlie said void regions of said bottom pattern.

4. A tilt sensor apparatus as claimed in claim 1 wherein said conductive element is substantially spherical.

5. A tilt sensor apparatus as claimed in claim 1 wherein at least a portion of said opening has a frusto-conical shape.

6. A tilt sensor apparatus as claimed in claim 1 wherein said opening is horizontally elongated.

7. A tilt sensor apparatus as claimed in claim 6 wherein:
said bottom pattern is a first bottom pattern;
said first conductive layer is formed into a second bottom pattern having alternating conductive and void regions, wherein said conductive regions of said second bottom pattern are electrically coupled together; and
said first and second bottom patterns are spaced apart to prevent said conducting element from simultaneously contacting both of said first and second bottom patterns and electrically isolated from one another.

8. A tilt sensor apparatus as claimed in claim 7 wherein:
said conductive element causes said tilt sensor apparatus to exist in a first state (140) in which a short is formed between said first bottom pattern and said intra-substrate conductor, a second state (144) in which a short is formed between said second bottom pattern and said intra-substrate conductor, and a third state (142) in which no short is formed between either said first or second bottom patterns and said intra-substrate conductor; and
said tilt sensor apparatus additionally comprises a control circuit (124) coupled to said first and second bottom patterns, said control circuit being configured to continuously indicate a first-orientation until said second state is detected, then indicate a second orientation, and to continuously indicate said second orientation until said first state is detected, then indicate said first orientation.

9. A tilt sensor apparatus as claimed in claim 1 additionally comprising a battery (66) vertically aligned with said second substrate and in contact with one of said first and third conductive layers.

10. A tilt sensor apparatus as claimed in claim 1 wherein:
said first conductive layer exhibits a first predetermined thickness;
said second substrate has a conductive layer facing said first conductive layer, said second substrate conductive layer exhibiting a second predetermined thickness of greater than or equal to zero; and
said second substrate is spaced apart from said first substrate by a distance of no more than a sum of said first and second predetermined thicknesses.

11. A tilt sensor apparatus as claimed in claim 1 wherein said intra-substrate conductor substantially covers said entire opening wall.

12. A tilt sensor apparatus as claimed in claim 1 wherein said bottom pattern is a star pattern having a central conductive region and elongated conductive regions extending radially from said central region and having said void regions located between said elongated regions.

13. A tilt sensor apparatus as claimed in claim 12 wherein said elongated conductive regions and said conductive element are mutually dimensioned so that said conductive element can simultaneously contact any adjacent two of said elongated conductive regions and said annular tangential-contact band of said intra-substrate conductor while avoiding contact with said first substrate in said void region between said adjacent two of said elongated conductive regions.

14. A tilt sensor apparatus as claimed in claim 1 wherein:
said tilt sensor apparatus exists in a first state in which a short is formed between said first conductive layer and said intra-substrate conductor, a second state in which a short is formed between said intra-substrate conductor and said third conductive layer, and a third state in which no short is formed between either said first or third conductive layers and said intra-substrate conductor; and
said tilt sensor apparatus additionally comprises a control circuit coupled to said first, and third conductive layers and to said intra-substrate conductor, said control circuit being configured to continuously indicate a first orientation until said second state is detected, then indicate a second orientation, and to continuously indicate said second orientation until said first state is detected, then indicate said first orientation.

15. A tilt sensor apparatus as claimed in claim 14 wherein said control circuit comprises:
a power consuming element (126) selectively coupled to said first conductive layer; and
a control element (134) coupled to said power consuming element and configured to couple said power consuming element to said first conductive layer when said control circuit indicates said second orientation and to decouple said power consuming element from said first conductive layer when said control circuit indicates said first orientation.

16. A tilt sensor apparatus as claimed in claim 1 wherein:
said opening is a first opening, and said opening wall is a first opening wall;
said second substrate has a second opening surrounded by a second-opening wall and has an intra-substrate conductor on said second opening wall, said second opening overlying said first substrate and underlying said third conductive layer of said third substrate; and
said tilt sensor apparatus additionally comprises a second conductive element positioned within said second opening and configured to freely move within said second opening to short said intra-substrate conductor in said second opening to said third conductive layer.

17. A tilt sensor apparatus as claimed in claim 16 wherein:
said first and second opening walls exhibit substantially identical angles;
said first conductive layer underlies said second opening;
said third conductive layer overlies said first opening;
said first conductive layer underlying said first opening is electrically coupled to said first conductive layer underlying said second opening;

said third conductive layer overlying said first opening is electrically coupled to said third conductor overlying said second opening; and
said intra-substrate conductors in said first and second openings are electrically coupled together.

18. A tilt sensor apparatus as claimed in claim 17 wherein said first and second opening walls exhibit different angles so that said tilt sensor apparatus senses two different angles of tilt.

19. A tilt sensor apparatus as claimed in claim 1 wherein said conductive element has a diameter less than two-thirds the thickness of said second substrate.

20. A tilt sensor apparatus as claimed in claim 1 wherein:
said opening exhibits a predetermined diameter at said annular tangential-contact band; and
said conductive element has a diameter which is less than 80% of said predetermined diameter.

21. A tilt sensor apparatus (36) comprising:
a first planar substrate (44) having a top surface (58) on which a first conductor (56) resides;
a second planar substrate (38) overlying said top surface of said first substrate, said second substrate having an opening (46) surrounded by an opening wall (52) and having a second conductor (54) on said opening wall;
a third planar substrate (40) overlying said second substrate and having a bottom surface (62) on which a third conductor (60) resides; and
a conductive element (64) positioned within said opening and configured to move within said opening to short said first conductor to said second conductor when resting on said first substrate, said conductive element having a diameter less than two-thirds the thickness of said second substrate.

22. A tilt sensor apparatus as claimed in claim 21 wherein said third conductor and said conductive element are mutually configured so that said conductive element shorts said third conductor to said second conductor when resting on said third substrate.

23. A tilt sensor apparatus as claimed in claim 21 wherein said opening is horizontally elongated.

24. A tilt sensor apparatus as claimed in claim 23 wherein:
said first conductor is formed into a first pattern (100") and a second pattern (100"); and
said first and second patterns are spaced apart to prevent said conducting element from simultaneously contacting both of said first and second patterns and electrically isolated from one another.

25. A tilt sensor apparatus as claimed in claim 21 additionally comprising a battery (66) vertically aligned with said second substrate and in contact with one of said first and third conductors.

26. A tilt sensor apparatus as claimed in claim 21 wherein:
said first conductor is provided by a conductive layer that exhibits a first predetermined thickness;
said second substrate has a conductive layer facing said first conductive layer, said second substrate conductive layer exhibiting a second predetermined thickness of greater than or equal to zero; and
said second substrate is spaced apart from said first substrate by a distance of no more than a sum of said first and second predetermined thicknesses.

27. A tilt sensor apparatus as claimed in claim 21 wherein said first conductor is formed in a star pattern which underlies said opening in said second substrate, said star pattern having a central region (102) and elongated regions (104) extending radially from said central region.

28. A tilt sensor apparatus as claimed in claim 27 wherein:
said star pattern is a first star pattern, said central region is a first central region, and said elongated regions are first elongated regions, and voids in said first conductor reside between said first elongated regions;
said third conductor is formed in a second star pattern (100') which overlies said opening in said second substrate, said second star pattern having a second central region and second elongated regions extending radially from said second central region; and
and said second star pattern is rotated relative to said first star pattern so that said second elongated regions of said second star pattern overlie said voids between said first elongated regions of said first star pattern.

29. A tilt sensor apparatus as claimed in claim 21 wherein:
said conductive element causes said tilt sensor apparatus to exist in a first state (140) in which a short is formed between said first and second conductors, a second state (144) in which a short is formed between said second and third conductors, and a third state (142) in which no short is formed between either said first or third conductors and said second conductor; and
said tilt sensor apparatus additionally comprises a control circuit (124) coupled to said first and third conductors, said control circuit being configured to continuously indicate a first orientation until said second state is detected, then indicate a second orientation, and to continuously indicate said second orientation until said first state is detected, then indicate said first orientation.

30. A tilt sensor apparatus as claimed in claim 29 wherein said control circuit comprises:
a power consuming element (126) selectively coupled to said first conductor; and
a control element (134) coupled to said power consuming element and configured to couple said power consuming element to said first conductor when said control circuit indicates said second orientation and to decouple said power consuming element from said first conductor when said control circuit indicates said first orientation.

31. A tilt sensor apparatus as claimed in claim 21 wherein:
said opening is a first opening, and said opening wall is a first opening wall;
said second substrate has a second opening surrounded by a second-opening wall and has a fourth conductor on said second opening wall, said second opening overlying said first substrate and underlying said third conductor of said third substrate;
said tilt sensor apparatus additionally comprises a second conductive element positioned within said second opening and configured to freely move within said second opening to short said first and fourth conductors together when in contact with said first conductor and to short said fourth and third conductors together when in contact with said third conductor.

32. A tilt sensor apparatus as claimed in claim 31 wherein:
said first and second opening walls each approach said first substrate at substantially identical angles and said first and second opening walls each approach said third substrate at substantially identical angles;
said first conductor underlies said second opening;
said third conductor overlies said first opening;
said first conductor underlying said first opening is electrically coupled to said first conductor underlying said second opening;

said third conductor overlying said first opening is electrically coupled to said third conductor overlying said second opening; and said second conductor is electrically coupled to said fourth conductor.

33. A tilt sensor apparatus as claimed in claim 31 wherein said first and second opening walls extend at different angles between annular tangential-contact bands in said first and second opening walls so that said tilt sensor apparatus senses two different angles of tilt.

34. A tilt sensor apparatus (36) comprising:
a first planar substrate (44) having a top surface (58) on which a first conductor (56) resides;
a second planar substrate (38) overlying said top surface of said first substrate, said second substrate having an opening (46) surrounded by an opening wall (52) and having a second conductor (54) on said opening wall;
a third planar substrate (40) overlying said second substrate and having a bottom surface (62) on which a third conductor (60) resides;
a conductive element (64) positioned within said opening and configured to move within said opening to short said first and second conductors together when resting on said first substrate; and
a battery (66) vertically aligned with said second substrate and in contact with one of said first and third conductors.

35. A tilt sensor apparatus as claimed in claim 34 wherein said conductive element shorts said second and third conductors together when resting on said third substrate.

36. A tilt sensor apparatus as claimed in claim 34 wherein:
said battery has opposing polarity terminals (70,72) located on opposing top and bottom sides of said battery; and
one of said terminals is electrically coupled between said first and third substrates through said second substrate.

37. A tilt sensor apparatus as claimed in claim 36 additionally comprising a control circuit (74) physically mounted on one of said first and third substrates and electrically coupled to each of said opposite polarity terminals of said battery and to said first, second, and third conductors.

38. A tilt sensor apparatus as claimed in claim 37 wherein said control circuit comprises a software-programmable device (124) configured to operate an asset tag (24) which times a duration a container in which bulk product (20) is stored is tilted, said duration describing a quantity of said product dispensed from said container (22), and which communicates said duration to a central facility (138).

39. A tilt sensor apparatus as claimed in claim 34 wherein:
said first conductive layer exhibits a first predetermined thickness;
said second substrate has a conductive layer facing said first conductive layer, said second substrate conductive layer exhibiting a second predetermined thickness of greater than or equal to zero; and
said second substrate is spaced apart from said first substrate by a distance of no more than a sum of said first and second predetermined thicknesses.

40. A tilt sensor apparatus as claimed in claim 34 wherein said first conductor is formed in a star pattern (100") which underlies said opening in said second substrate, said star pattern having a central region (102) and elongated regions (104) extending radially from said central region.

41. A tilt sensor apparatus as claimed in claim 34 wherein:
said conductive element causes said tilt sensor apparatus to exist in a first state (140) in which a short is formed between said first and second conductors, a second state (144) in which a short is formed between said second and third conductors, and a third state (142) in which no short is formed between either said first or third conductors and said second conductor; and
said tilt sensor apparatus additionally comprises a control circuit (124) coupled to said first and third conductors, said control circuit being configured to continuously indicate a first orientation until said second state is detected, then indicate a second orientation, and to continuously indicate said second orientation until said first state is detected, then indicate said first orientation.

42. A tilt sensor apparatus as claimed in claim 34 wherein:
said opening is a first opening, and said opening wall is a first opening wall;
said second substrate has a second opening surrounded by a second opening wall and has a fourth conductor on said second opening wall, said second opening overlying said first substrate and underlying said third conductor of said third substrate; and
said tilt sensor apparatus additionally comprises a second conductive element positioned within said second opening and configured to freely move within said second opening to short said fourth and third conductors together when resting on said third substrate.

43. A method of operating a low power tilt sensor (42) having a first pair of contacts (54/56), a second pair of contacts (54/60), and a conductive element (64) that moves under the acceleration of gravity (27) to short said first pair of contacts when said tilt sensor is tilted in a first orientation (32) and to short said second pair of contacts when said tilt sensor is tilted in a second orientation (26), said method comprising:
sensing (146) a shorted condition at said first pair of contacts;
generating (154) a first-orientation indicator in response to said sensing activity;
decoupling (156) a power-consuming element (126) coupled to said first pair of contacts in response to said sensing activity;
coupling (158) a power-consuming element to said second pair of contacts in response to said sensing activity; and
monitoring, in response to said coupling activity, said second pair of contacts for a shorted condition.

44. A method as claimed in claim 43 additionally comprising
detecting said shorting of said second pair of contacts in response to said monitoring activity;
generating a second-orientation indicator in response to said detecting activity;
decoupling said second power consuming element from said second pair of contacts in response to said detecting activity;
coupling said first power consuming element to said first pair of contacts in response to said detecting activity; and
monitoring said first pair of contacts for a shorted condition.

45. A method as claimed in claim 43 wherein said second-orientation indicator is an inverse of said first-orientation indicator.

46. A method as claimed in claim 43 wherein said monitoring activity detects, in a software-programmable device (124), an interrupt caused by said shorted condition on said first pair of contacts.

47. A method as claimed in claim 43 wherein said monitoring activity comprises:
placing a software-programmable device in a sleep mode in which said software-programmable device consumes less power than when in an awake mode; and
placing said software-programmable device in said awake mode in response to said shorted condition on said first pair of contacts.

48. A method as claimed in claim 43 additionally comprising coupling one of said first pair of contacts to one of said second pair of contacts and to a node adapted to receive a common potential.

49. A method as claimed in claim 43 wherein said generating activity comprises:
maintaining said first-orientation indicator when said first pair of contacts becomes open; and
removing said first-orientation indicator when said monitoring activity encounters said shorted condition for said second pair of contacts.

* * * * *